Patented Dec. 1, 1936

2,062,368

UNITED STATES PATENT OFFICE 2,062,368

PRODUCTION OF ACETYLAMINO-NAPHTHOL-SULPHONIC ACIDS

George Maurer, Carneys Point, N. J., and Stanley G. Ford, Wilmington, Del., assignors to E. I. du Pont de Nemours & Company, Wilmington, Del., a corporation of Delaware No Drawing. Application May 22, 1934, Serial No. 727,010

10 Claims. (Cl. 260—124)

This invention relates to improvements in the production of intermediates and dyes; more particularly, it relates to improvements in the production of acetylated aminonaphthol sulphonic acids and to dyes prepared therefrom.

Acetylated aminonaphthol sulphonic acids have been in use for some time in the preparation of certain azo dyes. Examples of such dyes which have been prepared from these intermediates are Pontacyl Carmine 2G, Color Index #31 (aniline diazotized and coupled to 1-acetylamino-8-naphthol-3,6-disulphonic acid) and Pontacyl Carmine 6B, Color Index #57 (para-amino-acet-anilide diazotized and coupled to 1-acetylamino-8-naphthol-3,6-disulphonic acid). Other similar colors are known.

The general method of procedure is outlined in the Color Index (see above) and in Fierz-David, "The Fundamental Processes of Dye Chemistry", English edition, page 114. It consists in dissolving the aminonaphthol sulphonic acid in an alkaline solution, adding an excess of acetic anhydride and stirring until acetylation is complete, cooling, and making the solution alkaline with sodium carbonate or ammonia or both; the resulting solution is coupled directly with a diazo compound to form an azo dye. When following the above procedure, the results obtained are frequently quite unsatisfactory. The yield and quality of the intermediate are both poor. This results in low yields and dull shades of finished dyestuff. Since these dyes are, when pure, of a rather bright shade, it is impossible to dispose of the duller material without resorting to an expensive purification procedure. These erratic and unsatisfactory results appear to be unavoidable when following the process as given in the prior art.

The present invention has for an object to increase the yield and improve the quality of acetylated aminonaphthol sulphonic acids. Another object is to increase the yield and brightness of shade of the dyes produced by coupling these acetylated aminonaphthol sulphonic acids with a diazotized azo component. A further object is to avoid the economic losses resulting from frequent batches of off-shade color which have to be repurified with considerable loss in yield. Other objects will appear hereinafter.

In accomplishing these objects, it has been found that improved results are obtained by dissolving and acetylating the aminonaphthol sulphonic acid in an acid medium rather than an alkaline medium, thereafter rendering the solution alkaline, preferably with a mild inorganic base, and heating it. A diazotized coupling component may then be added directly to the resultant solution to produce a dye.

The preferred mode of operation is as follows:
The aminonaphthol sulphonic acid is dissolved in water by the careful addition of sodium carbonate or sodium bicarbonate or other suitable alkali. The solution is not allowed to become alkaline at any time and when all of the intermediate is dissolved, the solution reacts slightly acid to litmus papers. Acetic anhydride is then added to this slightly acid solution and the acetylation carried to completion. The solution is then made distinctly alkaline to brilliant yellow paper by the addition of sodium carbonate, and the temperature raised to 70° C. to 80° C. for about fifteen minutes. The solution may then be cooled directly or it may be treated with charcoal and clarified before cooling. It is then ready to be coupled with a diazotized azo dye component to form an azo dye. It will be noted that the entire operation of dissolving and acetylating the aminonaphthol sulphonic acid is carried out in a slightly acid medium.

Very marked improvements in the yield and quality of the intermediate, and especially in the dyes produced therefrom, have resulted from the use of this improved process. Furthermore, the ease with which acetylation takes place is considerably increased so that one addition of acetic anhydride is almost always sufficient to complete the reaction.

The invention will be further illustrated, but is not limited, by the following examples, in which the quantities are stated in parts by weight.

Example I

Three hundred fifty (350) parts of the monosodium salt of 1-amino-8-naphthol-3,6-disulphonic acid (H-acid) are charged into 1400 parts of water and dissolved at room temperature by the careful addition of approximately 84 parts of sodium bicarbonate. Only enough sodium bicarbonate is added to dissolve the H-acid, leaving the solution slightly acid to litmus paper. Not at any time is the solution allowed to become alkaline. One hundred sixty (160) parts of acetic anhydride are then added and the mixture stirred for one-half hour. It is then tested for completion of the acetylation. If incomplete, more acetic anhydride is added and additional stirring allowed. This process is repeated until a satisfactory completion test is obtained. Approximately 160 parts of sodium carbonate are then added until the solution gives a light-red coloration on brilliant yellow paper. It is then heated to 70° C. for a few minutes and cooled to 10° C. to 12° C. by the addition of ice and water. Approximately 220 parts of sodium carbonate are added and allowed to dissolve.

This solution is now ready for coupling with a diazotized azo dye component. For example, when coupled with diazotized aniline, the dye is known as pontacyl carmine 2G ("Colour Index" #31). Other dyes can be prepared by substituting other diazo compounds for the diazobenzenechloride. Further examples of such azo dye components are the diazotized derivatives of the following: para-amino-acetanilide, ortho-anisidine, para-phenetidine, para-toluidine, meta-xylidine, para-xylidine, alpha-naphthylamine, beta-naphthylamine, anthranilic acid, sulfanilic acid, and naphthionic acid.

Example II

Two hundred sixty-three (263) parts of 2-amino-5-naphthol-7-sulphonic acid (J-acid) are charged into 3200 parts of water and dissolved at 35° C. by the addition of approximately 57 parts of sodium carbonate. Only enough sodium carbonate is added to completely dissolve the J-acid, leaving the solution slightly acid to litmus paper. Not at any time is the solution allowed to become alkaline. One hundred sixty (160) parts of acetic anhydride are added at once and the mixture stirred for thirty minutes. It is then tested for completion of the acetylation. If incomplete, more acetic anhydride is added and additional stirring allowed. This process is repeated until a satisfactory completion test is obtained. The solution is made alkaline to brilliant yellow paper with approximately 150 parts of sodium carbonate and heated to 80° C. Fifty (50) parts of decolorizing charcoal and 50 parts of Filter Cel are added and the mixture stirred for thirty minutes at 80° C. The solution is clarified through a filter press and the clear filtrate iced to 0° C. Thirty-four (34) parts of ammonia (100%) are then added.

This solution is now ready for coupling with a diazotized azo component. For example, when coupled with diazotized para-amino-acetanilide, the resulting dye is known as Brilliant Crocein FL Extra Conc. Other dyes can be prepared by substituting other diazo compounds such as, for example, those given in Example I.

Further examples of aminonaphthol sulphonic acids which may be employed in accordance with the invention are: 2-amino-8-naphthol-6-sulphonic acid (gamma acid), 1-amino-8-naphthol-4-sulphonic acid (S-acid) and 1-amino-8-naphthol-2,4-disulphonic acid (Chicago acid).

As indicated by Example II, the aminonaphthol sulphonic acid is dissolved with the aid of an alkaline reacting substance, thus partly converting it to a salt. If desired, the aminonaphthol sulphonic acid may be introduced into the reaction medium initially as a salt (cf. Example I). While the alkaline reacting substance is preferably a mild inorganic base such as, for example, potassium carbonate, sodium carbonate, potassium bicarbonate or sodium bicarbonate, other suitable alkalis may be used, as will be recognized by those skilled in the art.

Although acetic anhydride is the preferred acetylating agent, other acetylating agents such as, for instance, acetyl chloride may be employed.

Under the conditions used for acetylating the aminonaphthol sulphonic acids, certain side reactions occur forming by-products (usually not more than 10%) which do not readily couple. Heating the acetylated product in alkaline solution restores these by-products to the desired acetylated aminonaphthol sulphonic acids (then present as their salts). The temperature of heating should be insufficient to hydrolyze the acetyl-amino group or groups of the acetylated aminonaphthol sulphonic acids. Especially desirable results are obtained by heating the alkaline solution of the acetylated product to about 70° C. to about 80° C.

In addition to the advantages in yield and quality of the intermediate and of the dyes produced therefrom, the process of the invention possesses the advantage that it is well adapted to commercial production on a large scale.

As many apparently widely different embodiments of this invention may be made without departing from the spirit and scope thereof, it is to be understood that we do not limit ourselves to the specific embodiments thereof except as defined in the appended claims.

We claim:

1. The process of producing acetylated aminonaphthol sulphonic acids which comprises dissolving and acetylating the aminonaphthol sulphonic acid without making it alkaline, then making the reaction product alkaline, and heating the alkaline product to remove by-products.

2. In a process of producing acetylated aminonaphthol sulphonic acids and dyes therefrom, the step which comprises dissolving the aminonaphthol sulphonic acid in an aqueous medium without allowing it to become alkaline prior to acetylation.

3. In a process of producing acetylated aminonaphthol sulphonic acids and dyes therefrom, the step which comprises acetylating a compound of the class consisting of aminonaphthol sulphonic acids and salts thereof dissolved in an aqueous solution distinctly acid to litmus.

4. In a process of producing acetylated aminonaphthol sulphonic acids and dyes therefrom, the steps which comprise dissolving the aminonaphthol sulphonic acid in water maintained distinctly acid to litmus paper, and without allowing the solution to become alkaline at any time carrying out the acetylation in a solution distinctly acid to litmus.

5. In a process of producing acetylated aminonaphthol sulphonic acids and dyes therefrom, the steps which comprise dissolving the aminonaphthol sulphonic acid in water by partial neutralization with an alkali while maintaining the solution distinctly acid to litmus paper, and without allowing the solution to become alkaline at any time carrying out the acetylation in a solution slightly acid to litmus paper, thereafter making the solution mildly alkaline and heating to about 70° C. to about 80° C.

6. The process of claim 4 in which the aminonaphthol sulphonic acid is employed initially at least in part in the form of an alkali-forming metal salt thereof.

7. The process of producing an azo dye intermediate which comprises dissolving the monosodium salt of 1-amino-8-naphthol-3,6-disulphonic acid in a water solution with the addition of sodium bicarbonate sufficient in amount to dissolve the said salt while leaving the solution slightly acid to litmus paper, and without allowing the solution to become alkaline at any time carrying out the acetylation with acetic anhydride in a solution distinctly acid to litmus paper, thereafter adding sodium carbonate until the solution gives a light-red coloration on brilliant yellow paper, and heating to about 70° C.

8. The process of producing an azo dye intermediate which comprises introducing about 350 parts of the mono-sodium salt of 1-amino-8-naphthol-3,6-disulphonic acid into about 1400 parts of water and dissolving said salt at room temperature by the careful addition of approximately 84 parts of sodium carbonate, stirring the resultant solution with about 160 parts of acetic anhydride for about one-half hour, then adding about 160 parts of sodium carbonate, and heating the resultant product to about 70° C.

9. The process of producing an azo dye intermediate which comprises dissolving 2-amino-5-naphthol-7-sulphonic acid in water at about 35° C. by the addition of sodium carbonate while maintaining the solution distinctly acid to litmus paper, and without allowing the solution to become alkaline at any time carrying out the acetylation with acetic anhydride in a solution distinctly acid to litmus paper, then making the solution alkaline to brilliant yellow paper by the addition of sodium carbonate, and heating to about 80° C.

10. The process of producing an azo dye intermediate which comprises dissolving about 263 parts of 2-amino-5-naphthol-7-sulphonic acid in 3200 parts of water at about 35° C. by the addition of approximately 57 parts of sodium carbonate, acetylating the resultant solution with about 160 parts of acetic anhydride, then making the solution alkaline to brilliant yellow paper by the addition of approximately 150 parts of sodium carbonate, heating to about 80° C., adding about 50 parts of decolorizing charcoal and about 50 parts of Filter Cel, and stirring the mixture for about thirty minutes at 80° C.

GEORGE MAURER.
STANLEY G. FORD.